(12) United States Patent
Adam et al.

(10) Patent No.: US 10,482,625 B1
(45) Date of Patent: Nov. 19, 2019

(54) CALIBRATION OF NETWORKED IMAGING DEVICES TO A GLOBAL COLOR SPACE

(71) Applicant: Amazon Technologies, Inc., Seattle, WA (US)

(72) Inventors: Amit Adam, Haifa (IL); Ehud Benyamin Rivlin, Haifa (IL); Gerard Guy Medioni, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 136 days.

(21) Appl. No.: 15/472,166

(22) Filed: Mar. 28, 2017

(51) Int. Cl.
| | |
|---|---|
| *H04N 7/18* | (2006.01) |
| *G06T 7/80* | (2017.01) |
| *H04N 17/02* | (2006.01) |
| *G06T 7/90* | (2017.01) |

(52) U.S. Cl.
CPC .............. *G06T 7/80* (2017.01); *G06T 7/90* (2017.01); *H04N 7/181* (2013.01); *H04N 17/02* (2013.01); *G06T 2207/30204* (2013.01)

(58) Field of Classification Search
CPC . G06T 13/40; G06T 2200/24; H04N 1/00411; H04N 1/0044; H04N 1/00708; H04N 1/00827; H04N 1/04; H04N 2201/0094; H04N 5/222; H04N 5/262
USPC .......................................................... 348/159
See application file for complete search history.

(56) References Cited

U.S. PATENT DOCUMENTS

| | | | |
|---|---|---|---|
| 7,225,980 B2 | 6/2007 | Ku et al. | |
| 7,949,568 B2 | 5/2011 | Fano et al. | |
| 8,009,864 B2 | 8/2011 | Linaker et al. | |
| 8,175,925 B1 | 5/2012 | Rouaix | |
| 8,189,855 B2 | 5/2012 | Opalach et al. | |
| 8,228,400 B2 | 7/2012 | Liu et al. | |
| 8,423,431 B1 | 4/2013 | Rouaix et al. | |
| 8,630,924 B2 | 1/2014 | Groenevelt et al. | |
| 8,688,598 B1 | 4/2014 | Shakes et al. | |
| 8,977,073 B2 | 3/2015 | Kwon et al. | |
| 9,131,201 B1 | 9/2015 | Geiss | |
| 9,174,800 B1 * | 11/2015 | Curlander ................ G06K 9/00 |
| 9,384,539 B2 | 7/2016 | Park | |
| 9,473,747 B2 | 10/2016 | Kobres et al. | |
| 2003/0002712 A1 | 1/2003 | Steenburgh et al. | |
| 2004/0181467 A1 | 9/2004 | Raiyani et al. | |
| 2008/0055087 A1 | 3/2008 | Horii et al. | |
| 2008/0077511 A1 | 3/2008 | Zimmerman | |
| 2008/0109114 A1 | 5/2008 | Orita et al. | |
| 2009/0121017 A1 | 5/2009 | Cato et al. | |
| 2009/0245573 A1 | 10/2009 | Saptharishi et al. | |

(Continued)

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

(Continued)

*Primary Examiner* — Sath V Perungavoor
*Assistant Examiner* — Peet Dhillon
(74) *Attorney, Agent, or Firm* — Athorus, PLLC

(57) ABSTRACT

Described is a multiple-imaging device system and process for calibrating each of the imaging devices to a global color space so that image pixel values representative of an imaged object are the same or similar regardless of the imaging device that produced the image data or the lighting conditions surrounding the object.

20 Claims, 9 Drawing Sheets

(56) References Cited

U.S. PATENT DOCUMENTS

| | | | |
|---|---|---|---|
| 2010/0328481 A1* | 12/2010 | Shimizu | G06T 7/507 348/222.1 |
| 2011/0011936 A1 | 1/2011 | Morandi et al. | |
| 2011/0292455 A1 | 12/2011 | Takabatake et al. | |
| 2012/0284132 A1 | 11/2012 | Kim et al. | |
| 2013/0076898 A1 | 3/2013 | Philippe et al. | |
| 2013/0253700 A1 | 9/2013 | Carson et al. | |
| 2014/0176731 A1 | 6/2014 | Geiss | |
| 2014/0198226 A1 | 7/2014 | Lee | |
| 2014/0279294 A1 | 9/2014 | Field-Darragh et al. | |
| 2014/0285675 A1* | 9/2014 | Mullis | G06T 7/80 348/173 |
| 2014/0347521 A1 | 11/2014 | Hasinoff et al. | |
| 2015/0019391 A1 | 1/2015 | Kumar et al. | |
| 2015/0073907 A1 | 3/2015 | Purves et al. | |
| 2015/0348242 A1 | 12/2015 | Molgaard et al. | |
| 2015/0350509 A1 | 12/2015 | Tico et al. | |
| 2015/0371541 A1 | 12/2015 | Korman | |
| 2016/0012588 A1* | 1/2016 | Taguchi | H04N 17/002 348/46 |
| 2018/0114438 A1 | 4/2018 | Rajagopalan et al. | |
| 2018/0176483 A1 | 6/2018 | Knorr et al. | |
| 2018/0227562 A1 | 8/2018 | Bleyer et al. | |
| 2018/0247505 A1 | 8/2018 | Arai et al. | |
| 2018/0302571 A1 | 10/2018 | Kudo et al. | |

OTHER PUBLICATIONS

Cristian Pop, "Introduction to the BodyCom Technology", Microchip AN1391, May 2, 2011, pp. 1-24, vol. AN1391, No. DS01391A, Publisher 2011 Microchip Technology Inc.

Pharr et al., "Physically Based Rendering: From Theory to Implementation," http://www.pbrt.org:80/ (downloaded Mar. 14, 2017, by web.archive.org), 4 pages.

www.mitsuba-renderer.org, "Physically Based Renderer," http://www.mitsuba-renderer.org:80/ (downloaded Nov. 19, 2016, by web.archive.org), 2 pages.

Zivkovic, Zoran Improved Adaptive Gaussian Mixture Model for Background Subtraction, In Proc. ICPR, 2004, Intelligent and Autonomous Systems Group, University of Amsterdam, The Netherlands, 4 pages.

* cited by examiner

CALIBRATION OF NETWORKED IMAGING DEVICES TO A GLOBAL COLOR SPACE

BACKGROUND

Today, imaging devices such as digital cameras are frequently used for conducting surveillance or monitoring operations. For example, digital cameras are also often used to monitor the arrivals or departures of goods or the performance of services in materials handling facilities such as warehouses, fulfillment centers, retail establishments or other like facilities, as well as the travels of persons or objects in locations such as airports, stadiums or other dense environments, or the flow of traffic on one or more sidewalks, roadways or highways. Digital cameras are commonplace in financial settings such as banks or casinos, where money changes hands in large amounts or at high rates of speed.

When conducting surveillance or monitoring operations, digital cameras may be aligned and configured to capture imaging data such as still or moving images of actions or events occurring within their respective fields of view. Information regarding the captured imaging data or the observed actions or events may be subjected to further analysis to identify aspects, elements or features of the content expressed therein. In performing such operations, digital cameras may be utilized alone or in groups and objects may be tracked as they move between fields of views of different cameras.

In environments with varying lighting conditions, such as materials handling facilities, transportation centers, financial institutions or like structures in which different light sources are present in different areas, it may be difficult to track objects between cameras because the observed intensity of light reflecting off the objects will vary among cameras due to the different amounts and/or types of light in the area. This problem is further exacerbated due to variations among cameras.

DETAILED DESCRIPTION

Figure 1:
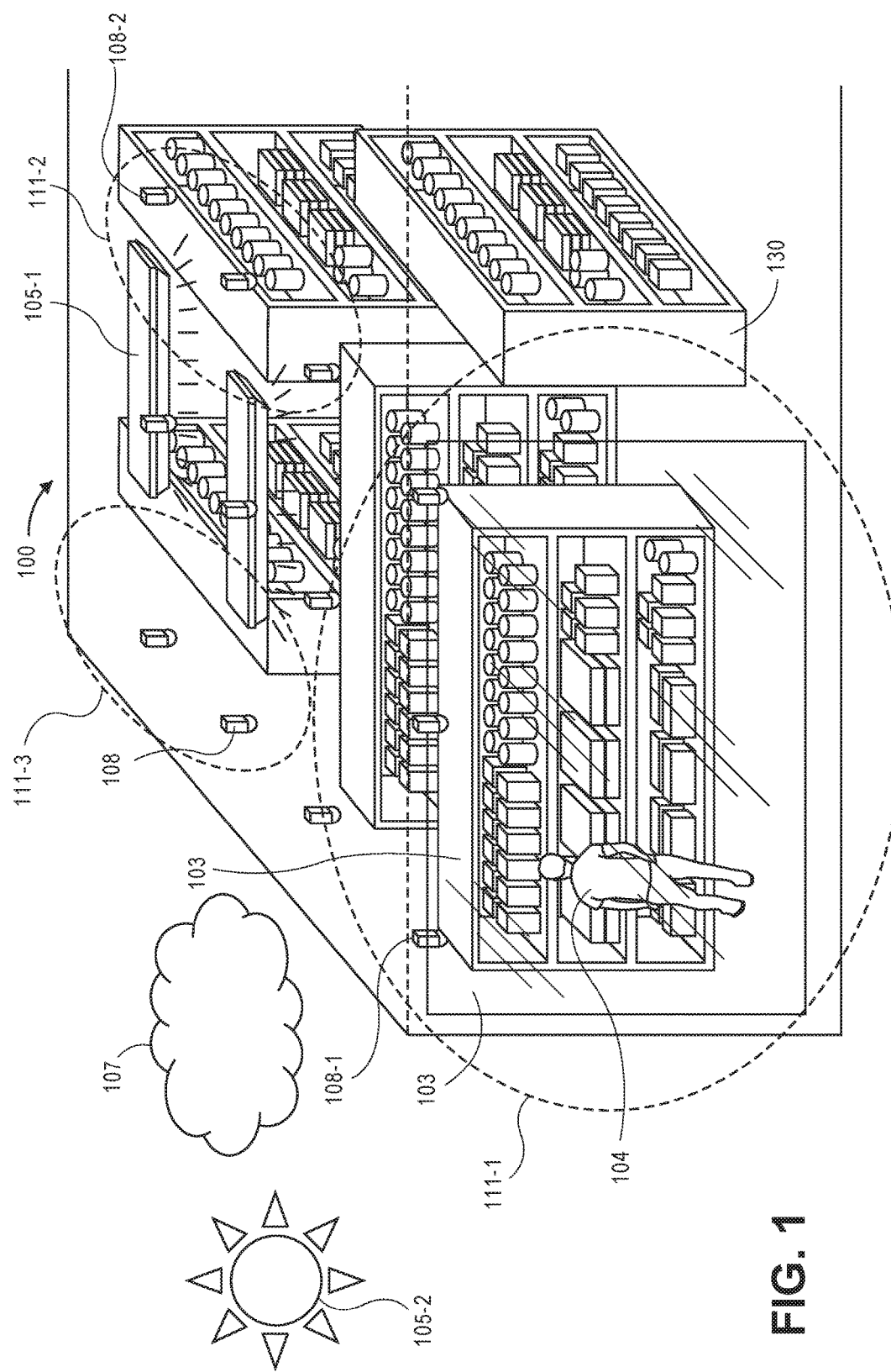
FIG. 1 is a diagram illustrating a materials handling facility with varying lighting conditions, in accordance with described implementations.

This disclosure describes a multiple-imaging device system and process for calibrating each of the imaging devices to a global color space so that image pixel values representative of an imaged object are the same or similar regardless of the imaging device that produced the image data or the lighting conditions surrounding the object. As discussed further below, each imaging device may produce a color video stream (image data) that includes a series of images representative of a field of view of the imaging device. The pixel values of those images are representative of the observed intensity of light measured by the imaging device and based in part on the parameters of the imaging device. Due to varying lighting conditions throughout the materials handling facility and variations among imaging devices (e.g., imaging device types, imaging device parameters), each imaging device will potentially produce different pixel values for the same object represented in an image. For example, the pixel values of image data representative of an object produced by a first imaging device may be different than the pixel values of image data representative of the same object produced by a second imaging device. Such variations make object tracking and/or re-identification difficult. The variation of pixel values for the same object produced by different imaging devices due to different lighting conditions and different imaging device parameters is referred to herein as a local color space. Accordingly, each imaging device has a local color space that is based on the lighting conditions in the field of view of the imaging device and the internal imaging device parameters.

To resolve the variations of pixel values due to different local color spaces of each imaging device in a network of imaging devices, the parameters of each imaging device are determined and a transformation function generated for each imaging device. The transformation function is then applied to pixel values of image data produced by the imaging device to convert the pixel values from the observed values, representative of the local color space for that imaging device, to normalized values corresponding to a global color space. This is done for each imaging device within the network of imaging devices such that an object will have the same or very similar pixel values representing the object within the materials handling facility regardless of the imaging device that produced the image. An imaging device that has a current transformation function is referred to herein generally as a calibrated imaging device. Likewise, an imaging device that does not have a current transformation function is referred to herein as an uncalibrated imaging device.

Because the parameters of each imaging device will vary over time due to variations or changes in the lighting conditions, a plurality of imaging devices and a plurality of markers within the materials handling facility may be utilized to periodically and automatically determine the transformation function for each imaging device to be calibrated. At a high level, assuming each imaging device has three unknown parameters that are related to the illumination within the field of view of the imaging device (e.g., gain, offset, and white balancing), transformation functions may be determined for each of a plurality of imaging devices provided the number of observations of the plurality of markers (also referred to herein as representations of markers in image data) is greater than or equal to the number of unknown parameters. This holds true even if the intrinsic values or albedos of the markers are unknown, as those values may be treated as parameters.

For example, if there are two imaging devices, there must be at least six markers that are represented in images from each of those two devices. In such an example, there will be twelve unknown parameters (the six unknown parameters of the two imaging devices and the six unknown parameters of the markers) and twelve observations (observations of the six markers from the first imaging device and observations of the six markers from the second imaging device). Because there are an equal number of observations and unknown parameters, the unknown parameters may be determined. Utilizing the determined parameters for each imaging device, a transformation function for each imaging device is produced that is used to transform pixel values produced by that imaging device from the local color space of the imaging device to a global color space.

Because the intrinsic value of the markers does not need to be known, any object or objects within the materials handling facility may be utilized as markers with the described implementations. For example, the field of view of each of the imaging devices may overlap and objects within the common field of view may be utilized as markers. In other examples, objects that are moving within the materials handling facility, such as agents, carts, machines, etc., may be utilized as markers. In such an instance, the field of view of the imaging devices need not overlap as the marker may move from the field of view of one imaging device to the field of view of another imaging device. In other instances, markers (stationary or viewable) that are not in the overlapping field of view may be used with other markers that are within an overlapping field of view.

As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, banks, casinos, airports, or other facilities or combinations of facilities for performing one or more functions of materials (inventory) handling.

FIG. 1 is a block diagram of a portion of a materials handling facility 100 with varying lighting conditions, in accordance with described implementations. In the illustrated example, the materials handling facility 100 may include a plurality of inventory locations 130 and one or more artificial illumination sources, such as ceiling lighting 105-1, floor lighting, etc., that produce light within the materials handling facility 100. In addition to the illumination sources 105-1 within the materials handling facility, other illumination sources, such as natural illumination sources, including the sun 105-2 or moon, and/or other artificial illumination sources external to the materials handling facility may impart light within one or more areas of the materials handling facility. For example, the materials handling facility may include one or more transparent or semi-transparent perimeters, such as a window 103, doors, skylights, etc., through which light produced from natural and/or artificial illumination source(s) external to the materials handling facility passes to illuminate areas 111 within the materials handling facility.

Light falls on every portion or point within an environment, such as the interior of a materials handling facility, and is then reflected from that environment point. The illumination sources 105 that generate the light reaching different areas within an environment may be characterized by their geometric properties and by their photometric properties. Examples of geometric properties are their shape (e.g., a point source, a light strip (linear source), an area source (sun, moon)) and the directions at which the illumination source 105 spreads the light. The photometric properties of an illumination source 105 refer to the intensity of light that the illumination source 105 emits. In addition, illumination sources 105 generally produce light at different wavelengths. Therefore, we refer to the intensity of light as a function of wavelength, or spectrum. In addition to direct light within an environment, there is also ambient light, which refers to light from all sources that is reflected from other points within the environment (e.g., walls, floors, and ceilings).

Once light falls on an environment point, some of the light is reflected while other parts of the light are absorbed, or reflected in a different direction. In general, we specify the way an object or other material interacts with light by specifying how much light is reflected in every direction, for every incoming direction of the light. The reflectiveness of an object may be referred to as Bidirectional Reflectance Distribution Function ("BRDF"), which may also depend on the wavelength of the light. For purposes of this discussion, we will consider all surfaces of objects as evenly reflecting light in all directions and independent of the direction of the incoming light. In addition, we will refer to the albedo or intrinsic reflectance of an object as the measure of percentage of light that is reflected by the surface of the object. As an example, a black surface has zero reflectance because it absorbs all incoming light. In addition, because the implementations discussed herein relate to calibrating color imaging devices, we will assume that reflected light can be represented based on a certain amount of the light reflected in each of the red, green, and blue wavelengths. Thus, the albedo of an object can be represented by three numbers—namely the percentage of light reflected in each of the red, green, and blue (RGB) wavelengths. Accordingly, the albedo, or intrinsic color, is an intrinsic property of the surface of the object.

The materials handling facility also includes a network of imaging devices 108. In the illustrated example, each imaging device is arranged in a fixed overhead location and positioned to produce overhead image data of objects located within the field of view of the imaging device. As discussed further below with respect to FIG. 2, any number of imaging devices may be utilized and the imaging devices 108 may be arranged such that the field of view of two or more imaging devices at least partially overlap. In addition, while the example illustrated in FIG. 1 illustrates the imaging devices 108 positioned toward a ceiling of the materials handling facility, in other implementations, as discussed below with respect to FIG. 5, the imaging devices may be at any position within the materials handling facility.

While the implementations discussed herein describe imaging devices in the form of digital color cameras or digital color video cameras, it will be appreciated that the imaging devices may be any form of imaging device including, but not limited to, digital cameras, depth sensors, range cameras, infrared cameras, or radiographic cameras. Likewise, the image data produced by the imaging devices includes, but is not limited to, visual image data, depth image data, infrared image data, radiographic image data, etc. Such devices generally operate by capturing light that is reflected from objects within an environment and integrating the light with a sensor.

Reflected light may be captured or detected by an imaging device if the reflected light is within the device's field of view, which is defined as a function of a distance between a sensor and a lens within the imaging device, viz., a focal length, as well as a location of the imaging device and an angular orientation of the imaging device's lens. Accordingly, where an object appears within a depth of field, or a distance within the field of view where the clarity and focus is sufficiently sharp, an imaging device may capture light that is reflected off objects of any kind to a sufficiently high degree of resolution using one or more sensors thereof, convert, and store information regarding the reflected light in one or more data files.

When light is received by an imaging device it is integrated by an image sensor (e.g., a photosensitive surface with a plurality of pixel sensors provided thereon) of the imaging device having one or more filters associated therewith. Such sensors may detect information regarding aspects of any number of pixels of the reflected light corresponding to one or more base colors (e.g., red, green or blue) of the reflected light, or distances to objects from which the light was reflected. Pixel readout is a result of integrating all absorbed photons of light at all wavelengths. In the discussed imaging devices 108, one of three possible color filters are placed before the sensor element. Each color filter essentially modifies the pixel's sensitivity to each wavelength. For example, a red color filter passes mostly photons in the higher wavelengths, so we may think of it as giving the pixel a high sensitivity to higher wavelengths and a low sensitivity to lower wavelengths, such as blue. As a result of the three different color filters (R, G, B), each pixel includes three readings, one for each wavelength sensitivity profile.

The pixel readings are then converted to final R, G, B intensity values, referred to herein collectively as pixel values. The processing involved in producing the final R, G, B intensity values of a pixel involves translation from a raw pixel output to a digital value between 0 and 255. This mapping may be linear or with another shape typically involving a parametric form with an exponent termed gamma. In addition to converting the raw pixel value to digital values, each of the values may be scaled by different amounts to compensate for undesired overall color of the image due to the illumination of the environment. This scaling is generally referred to as white balancing. Other adjustments may likewise be made to the pixel values including adjusting for gain, offset, etc. These adjustments are typically performed by the imaging device to account for the illumination of the environment being imaged and are referred to herein generally as imaging device parameters.

An imaging device that is configured to capture and store visual image data (e.g., color images) is commonly called an RGB ("red-green-blue") imaging device (or camera), while an imaging device that is configured to capture both visual image data and depth image data (e.g., ranges) is commonly referred to as an RGBz or RGBD imaging device (or camera). Image data files may be stored in any number of formats, including but not limited to .JPEG or .JPG files, or Graphics Interchange Format (or ".GIF"), Bitmap (or ".BMP"), Portable Network Graphics (or ".PNG"), Tagged Image File Format (or ".TIFF") files, Audio Video Interleave (or ".AVI"), QuickTime (or ".MOV"), Moving Picture Experts Group (or ".MPG," ".MPEG" or ".MP4") or Windows Media Video (or ".WMV") files.

Many imaging devices also include manual or automatic features for modifying their respective fields of view or orientations. For example, an imaging device may be configured in a fixed position, or with a fixed focal length (e.g., fixed-focus lenses) or angular orientation. Alternatively, an imaging device may include one or more actuated or motorized features for adjusting a position of the imaging device, or for adjusting either the focal length (e.g., a zoom level of the imaging device) or the angular orientation (e.g., the roll angle, the pitch angle or the yaw angle), by causing a change in the distance between the sensor and the lens (e.g., optical zoom lenses or digital zoom lenses), a change in the location of the imaging device, or a change in one or more of the angles defining the angular orientation.

For example, an imaging device may be hard-mounted to a support or mounting that maintains the device in a fixed configuration or angle with respect to one, two or three axes. Alternatively, however, an imaging device may be provided with one or more motors and/or controllers for manually or automatically operating one or more of the components, or for reorienting the axis or direction of the device, i.e., by panning or tilting the device. Panning an imaging device may cause a rotation within a horizontal plane or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Furthermore, some imaging devices may digitally or electronically adjust an image identified in a field of view, subject to one or more physical or operational constraints. For example, a digital imaging device may virtually stretch or condense the pixels of an image in order to focus or broaden the field of view of the digital imaging device, and also translate one or more portions of images within the field of view. Some imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

As will be appreciated, different areas 111 within a materials handling facility 100 may experience different lighting conditions. For example, a first area 111-1 of the materials handling facility may have a first set of lighting conditions due to natural light passing through a window, direct light from artificial illumination sources within the materials handling facility 100, and ambient light. In comparison, other areas, such as areas 111-2 and 111-3 that are farther within the interior of the materials handling facility may have different lighting conditions because those areas do not receive direct natural light and/or because the light from the artificial illumination sources is different. Still further, the geometry of the areas may impact the lighting conditions. For example, areas with large objects (e.g., inventory shelves) may affect how light falls on surfaces within the area and thus, how much light is eventually received by the imaging devices in that area.

Because the position, orientation, etc., of imaging devices may vary over time and because the illumination of the environment being imaged by the imaging device may likewise vary with respect to time, the imaging device parameters may be adjusted to account for the changes. Lighting conditions within a materials handling facility may change for stationary or adjustable imaging devices. For example, as the time of day, position of the sun 105-2, and/or weather conditions change, such as clouds 107 passing between the sun 105-2 and the materials handling facility 100, the lighting conditions within different areas of the materials handling facility may change. As another example, if an artificial illumination sources 105-1 within the materials handling facility is altered (e.g., dimmed) or one or more of the artificial illumination sources 105-1 is powered off or becomes inoperable, the lighting conditions may change.

As lighting conditions within an area change, or the field of view of an imaging device changes (e.g., the imaging device is moved, rotated, etc.), the imaging device parameters are adjusted to account for the changes in the lighting conditions. As a result of the different light conditions and the different imaging device parameters for different imaging devices, the pixel values representative of an imaged object may be different for different imaging devices. As such, each imaging device has its own local color space which is dependent on the lighting conditions and the internal imaging device properties, and which impacts the pixel values for images generated by the respective imaging device. In comparison, as discussed further below, through use of the described implementations, the imaging device may be calibrated so that each of the pixel values produced in the local color space are be transformed to a global color space. In the global color space, the image data is normalized with transformation functions so that an object imaged by one imaging device will be represented by the same or very similar pixel values as those produced by a second imaging device.

For example, if an agent 104 is imaged with a first imaging device 108-1 positioned in the first area 111-1 of the materials handing facility and then the agent 104 moves to a second area 111-2 of the materials handling facility and is imaged by a second imaging device 108-2, the pixel values representative of the user will be the same when transformed from the respective local color spaces to the global color space. Transforming pixel values of image data to a global color space improves the ability to track and/or re-identify objects, such as agents 104, within the materials handling facility.

Figure 2:
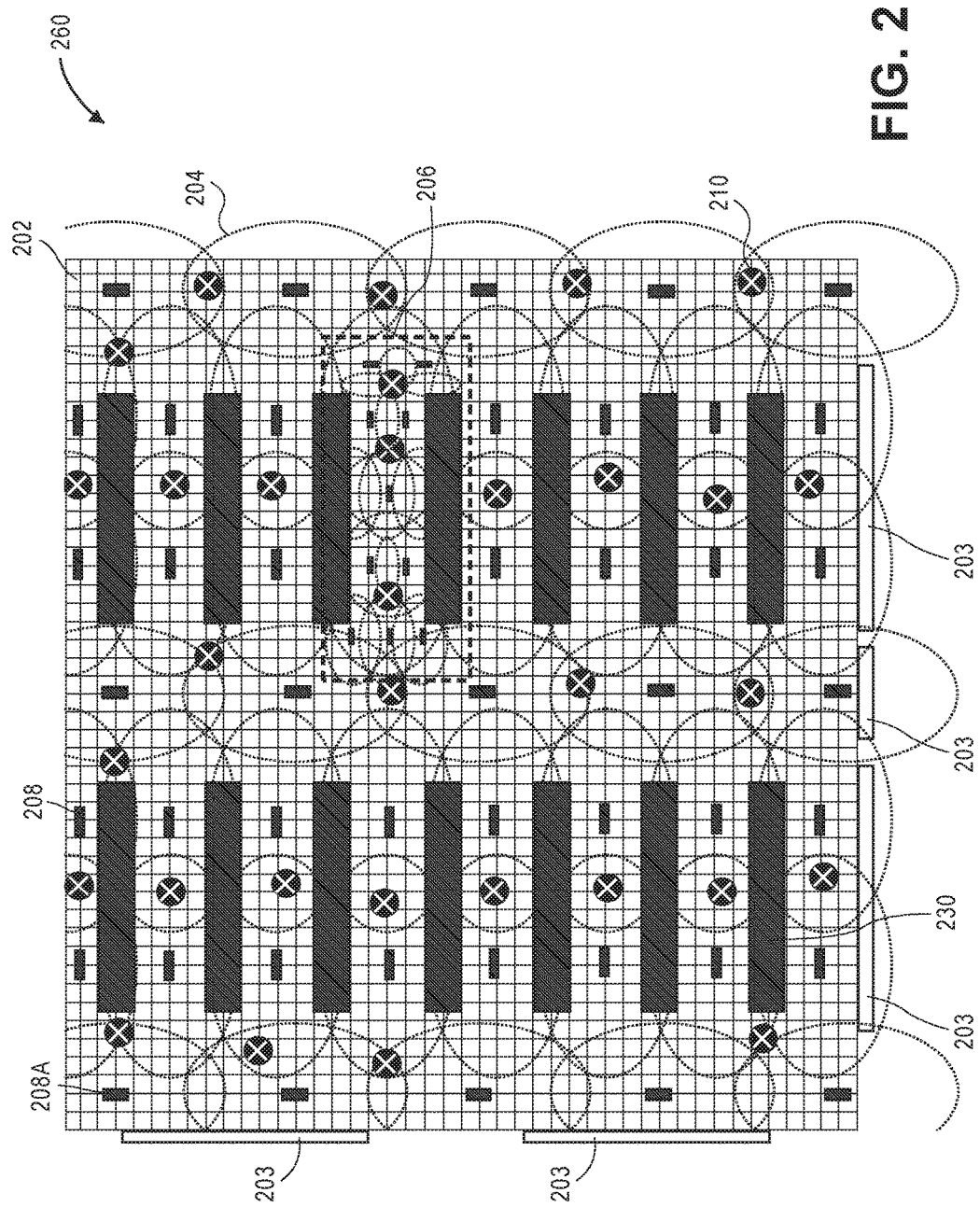
FIG. 2 is a block diagram of an overhead view of a cluster of imaging devices within a materials handling facility, in accordance with described implementations.

FIG. 2 is a block diagram of an overhead view of a cluster 260 of imaging devices within a materials handling facility, in accordance with the described implementations. A cluster may represent a segment of a materials handling facility or all of the materials handling facility. In some implementations, a single materials handling facility may include a plurality of clusters. In other implementations, a single cluster may be used to cover an entire materials handling facility.

Within each cluster 260, a plurality of imaging devices 208 may be positioned overhead (e.g., on a ceiling), referred to herein as overhead imaging devices or overhead imaging devices, at defined locations so that the collective field of view of the imaging devices covers the entire surface of the portion of the materials handling facility corresponding to the cluster 260. In some implementations, a grid 202 system, physical or virtual, is oriented with the shape of the materials handling facility (e.g., oriented with the walls of the materials handling facility). The grid 202 may be utilized to attach or mount imaging devices within the cluster 260 at defined locations with respect to the physical space of the materials handling facility. For example, in some implementations, the imaging devices may be positioned at any one foot increment from other imaging devices along the grid.

By mounting the imaging devices overhead at defined locations along the grid, the imaging devices can be associated with physical coordinates, also referred to herein as real world positions, within the materials handling facility. For example, if the cluster 260 represents the north-west corner of a materials handling facility, the grid 202 may be segmented into columns and rows and imaging devices may be positioned at any point on the grid. The columns and rows may be identified using any nomenclature, such as alphabetical characters for columns and numeric characters for rows. Each column:row intersection is at a defined physical location within the materials handling facility. For example, if the grid is positioned in one foot by one foot increments, the physical location within the materials handling facility of every grid intersection and any connected imaging devices is known. In this example, imaging device 208A is positioned at grid coordinate B:3, which corresponds to the horizontal coordinate of the imaging device being positioned approximately two feet by three feet from the origin (in this example the upper left corner) of the cluster.

Because the field of view 204 of the imaging devices 208 may not be circular, the imaging devices may be placed at defined directions (e.g., 0, 90, 180, 270 degrees). The direction of the imaging device may be determined based on the field of view 204 coverage of adjacent imaging devices and/or the layout of objects on the surface of the materials handling facility. For example, if the imaging device 208 is being mounted above an aisle between two inventory locations 230, the direction of the imaging device may be set so that the larger portion of the field of view 204 of the imaging device covers the length of the aisle.

The height of the imaging devices from the surface, the distance between imaging device placement and/or direction of the imaging devices 208 within the cluster 260 may vary depending on the layout of the materials handling facility, the lighting conditions in the cluster, the volume of agents expected to pass through a portion of the cluster, the activities and/or volume of activities expected to occur at different locations within the cluster, etc. For example, imaging devices may typically be mounted horizontally every three to four feet in one direction and every four to five feet in another direction along the grid 202 so that the field of view of each imaging device overlaps, as illustrated in FIG. 2.

In some implementations, the height of the imaging devices from the surface and the distance between imaging devices may be set so that their fields of view intersect and begin to overlap approximately seven feet above the surface of the materials handling facility. Positioning the imaging devices so that the fields of view overlap at approximately seven feet will result in the majority of agents and/or other objects being within a field of view of an imaging device at all times. If the field of view of the imaging devices did not overlap until they were approximately three feet above the surface, as an agent moves between the fields of view, the portion of the agent that is taller than approximately three feet would exit one field of view and not enter the next field of view until the agent has moved into that range of the imaging device. As such, a portion of the agent is not detectable as they transition between fields of view. Likewise, by overlapping the fields of view of multiple imaging devices, each of the overlapping imaging devices may capture images that include representations of the agent from slightly different perspectives and/or capture images of markers located within the materials handling facility.

While this example describes overlapping imaging device fields of view at approximately seven feet above the surface of the materials handling facility, in other implementations, the imaging devices may be positioned so that the fields of view begin to overlap at different heights (e.g., six feet, eight feet). Likewise, as discussed further below, in some implementations, imaging devices may be positioned at locations other than overhead and/or may be different orientations or degrees of tilt. For example, some imaging devices of the cluster 260 may be mounted on the sides of inventory locations 230 and have a field of view that is substantially perpendicular to the field of view of other imaging devices of the cluster 260.

In some areas of the cluster, such as cluster area 206, imaging devices 208 may be positioned closer together and/or closer to the surface area, thereby reducing their field of view, increasing the amount of field of view overlap, and/or increasing the amount of coverage for the area. Increasing imaging device density may be desirable in areas where there is a high volume of activity (e.g., item picks, item places, agent dwell time), high traffic areas, high value items, poor lighting conditions, etc. By increasing the amount of coverage, the image data increases and/or the amount of field of view overlaps increases, thereby increasing the likelihood that an activity or action will be properly determined.

In some implementations, one or more markers 210 may be positioned throughout the cluster and used with the implementations discussed herein to determine parameters of the imaging devices and produce transformation functions for each of the imaging devices 208. The markers 210 may be placed at any location within the cluster, may be stationary, mobile, permanent, or temporary. In some implementations, the markers 210 may be placed on the surface of the materials handling facility. In other implementations, the markers 210 may be placed on a visible surface of an inventory location 230 within the cluster. In still other implementations, portions of the inventory location 230 itself may be utilized as a marker. Alternatively, or in addition thereto, one or more inventory items that are viewable by the imaging devices may be used as the marker 210. In still other examples, the surface of the materials handling facility may have a detectable pattern, marks, defects, etc., that can be determined and used as markers 210. In general, the markers may be any identifiable object and may be a portion of an inventory location, a mark of the surface of the materials handling facility, a portion of an agent (e.g., a hat, shirt), a machine (e.g., forklift), an item, etc.

Figure 3A:
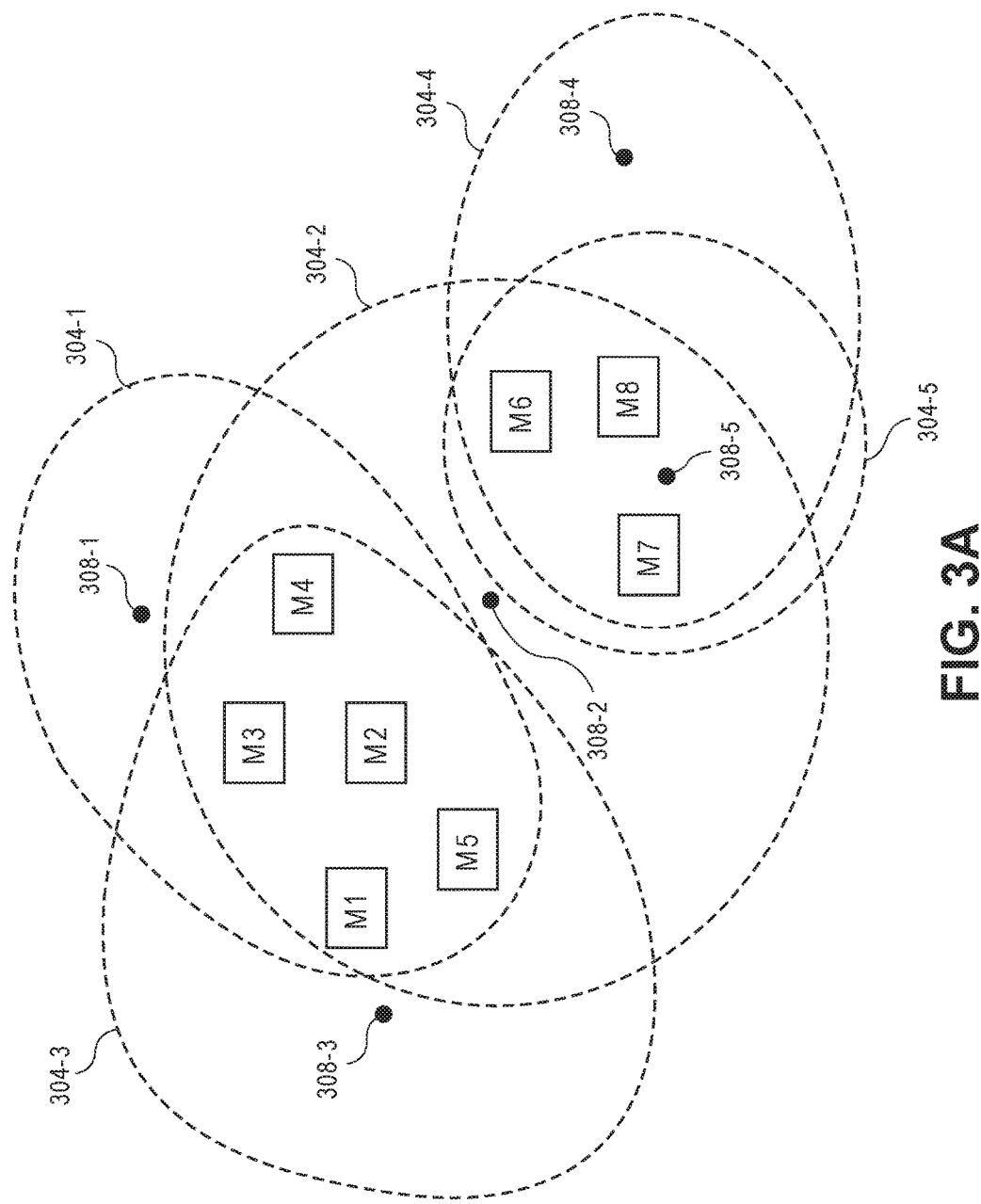
FIG. 3A is a block diagram illustrating overlapping fields of view of imaging devices and corresponding markers, in accordance with described implementations.

FIG. 3A is a block diagram of a plurality of markers M1, M2, M3, M4, M5, M6, M7, and M8 and fields of view 304-1, 304-2, 304-3, 304-4, and 304-5 of a plurality of imaging devices 308-1, 308-2, 308-3, 308-4, and 308-5, such as the imaging devices of the materials handling facility discussed with respect to FIG. 2, in accordance with described implementations. When several imaging devices observe the same marker, we know that the observed marker has the same albedo regardless of the imaging device and/or the position or location of the marker. For example, if marker M1 has an intrinsic albedo of the color blue, the marker M1 is blue regardless of the observed pixel values produced by the different imaging devices 308. The different observed pixel values from the different imaging devices of the marker are the result of the different imaging device parameters and/or the result of different lighting conditions. For example, the pixel values representative of marker M1 produced by imaging device 308-1 may be different than the pixel values representative of the marker M1 produced by imaging device 308-2 because of the different imaging device parameters and/or the different lighting conditions. For example, imaging device 308-1 may be oriented away from a light source while imaging device 308-2 may be oriented toward the light source, thereby producing different lighting conditions for each of the imaging devices. The different pixel values of the images representative of the observed color values of the marker and the fact that the marker has an intrinsic albedo that is unchanged, we can determine information about lighting conditions and imaging device parameters within the materials handling facility.

For ease of explanation, the discussion herein generally refers to pixel values, imaging device parameters, markers, and the albedo of a marker. However, it will be appreciated that the described implementations may be performed for each channel of the corresponding pixel values and each of the imaging device parameters, markers, and albedo may be different for each channel. For example, if an imaging device produces image data with pixel values representative of three different channels—R, G, and B—the implementations may be performed independently for each of the three channels, thereby producing three different transformation functions for each imaging device, one for each channel. Accordingly, it will be understood that the described implementations apply independently to each channel represented by a pixel value of image data. For example, in RGB imaging devices that provide image data that includes pixel values for each of the R, G, and B channels, the described implementations may be performed three different times, once for each channel, to produce three different transformation functions, one for each channel. Those transformation functions may then be used for each channel to transform the respective pixel values of that channel from the local color space of the imaging device to the global color space.

Information about the intensity of a marker as observed by an imaging device and the intrinsic albedo of the marker can be represented as a parametric model:

$$R = K^* \rho^\gamma + d \qquad (1)$$

In the above parametric model (1), α represents the observed intensity of the marker at the imaging device. K, ρ, and γ are parameters that describe both the illumination intensity and the internal imaging device parameters (e.g., gain, offset, white balance). d represents the offset darkness, a small value. Every channel (Red, Green, Blue) of an imaging device may be modeled using the above parametric model (1) because there are three albedos for the marker (one for Red, one for Green, and one for Blue) three observed intensities, again for red, greed, and blue, and three sets of imaging device parameters that describe jointly the illumination intensities at every channel and imaging device parameters at every channel.

Each imaging device has three unknown parameters that are related to the illumination present in the field of view of the imaging device and the internal parameters of the imaging device. The parameters for each imaging device of a plurality of imaging devices may be represented as:

$$\theta_i = (k_i, \gamma_i, d_i) \qquad (2)$$

Referring to the example illustrated in FIG. 3A, the parameters for each of the imaging devices 304 has three different unknown variables $\theta_i$. Likewise, each marker, M1, M2, M3, M4, M5, M6, M7, and M8 is characterized by its own intrinsic albedo, denoted as $\rho_j$ for each marker j. The expected observed intensity of marker j, as observed by imaging device i is denoted as:

$$\hat{R}_{i,j} = k_i^* \rho^{\gamma i} + d_i \qquad (3)$$

If we have an assumption of the values of the unknown parameters k, ρ, γ, d, we can compute the expected observed intensities $\hat{R}$ at each imaging device. Alternatively, as used herein, we can measure the observed intensity R based on the pixel values of the image data produced by the imaging device 308 that represent a respective marker. Provided there is a greater or equal number of observations of markers by a plurality of imaging devices than there are unknown parameters (i.e., more representations of markers in the image data than there are unknown parameters), we can determine the unknown parameters based on the observed intensities of each marker by each imaging device by solving an optimization problem, such as:

$$\min_{k_i,\gamma_i,\rho_i} \sum [R_{i,j} - (k_i * \rho_j^{\gamma_i} + d_i)]^2 \quad (4)$$

As noted above, the optimization problem (4) may be solved independently for each of the three channels, R, G, and B.

With the above optimization problem (4), the sum is the overall observations $R_{i,j}$ for all pairs of imaging devices and markers for a channel. Referring again to FIG. 3A, considering the first three imaging devices 308-1, 308-2, and 308-3, we need observations of at least five markers by each of those imaging devices 308-1, 308-2, and 308-3, such as markers M1, M2, M3, M4, and M5 to solve the optimization problem (4). In such a combination, there are fourteen unknown parameters and fifteen observations. The unknown parameters include the nine unknown parameters of three imaging devices 308-1, 308-2, and 308-3 (three unknown parameters for each of the three imaging devices) and the five unknown albedos of the markers M1, M2, M3, M4, and M5. The fifteen observations are the representations of the five markers produced by the three imaging devices.

Because there are fewer unknown parameters than there are observations, the optimization problem (4) can be solved. As discussed further below, if already calibrated imaging devices are included, or markers for which the albedo parameter has been determined, the minimum number of imaging device and marker pairs is reduced.

Upon solving the optimization problem, we obtain the parameters $\theta_i=(k_i, \gamma_i, d_i)$ that characterize the internal parameters and lighting conditions for each imaging device considered. These parameters then form the transformation function that is used to transform the pixel values of image data produced by the imaging device i from the local color space of the imaging device to a global color space, which describes the intrinsic albedo of every point imaged by the imaging device. The transformation function takes the following form for each pixel of an image produced by the imaging device having an intensity R:

$$\rho = \left(\frac{R - d_i}{k_i}\right)^{\frac{1}{\gamma_i}}$$

As noted above, the optimization problem may be solved for each channel of each imaging device to produce respective transformation functions for each channel.

The optimization problem may be solved for different groups of imaging devices and may use parameters from a calibrated imaging device as an input for another optimization problem that includes the imaging device and other imaging devices for which a transformation function is to be determined. For example, upon determining the parameters for imaging devices 308-1, 308-2, and 308-3, the imaging device 308-3, and determined parameters, may be used in conjunction with imaging devices 308-4 and 308-5 to determine parameters and corresponding transformation functions for imaging devices 308-4 and 308-5. Using imaging device 308-3 and the already determined parameters reduces the number of markers necessary to solve the optimization problem because there are not as many unknown parameters and more observations. For example, to determine the parameters for imaging devices 308-4 and 308-5, when including imaging device 308-3 and the parameters already determined for that imaging device, only three markers M6, M7, and M8 are necessary. In such a configuration, there would be nine unknown parameters and nine observations. The nine unknown parameters are the six parameters of the imaging devices 308-4 and 308-5 (three unknown parameters for each of the two imaging devices) and the three unknown albedos of the markers M6, M7, and M8. The nine observations are the observations of each marker M6, M7, and M8 from each of the three imaging devices 308-3, 308-4, and 308-5.

In addition and/or as an alternative to reusing calibrated imaging devices in multiple optimizations to reduce the number of unknown parameters and thus the number of markers needed, markers for which the albedo parameter has been determined may be used as a known parameter in other optimization problems. For example, once the albedo parameter for marker M7 has been determined, that marker may be used in another optimization problem, alone or in conjunction with an imaging device for which parameters have been determined to solve an optimization problem that includes other imaging devices. For example, if a marker with a known albedo parameter and an imaging device with known parameters are included in another optimization to determine transformation functions for two other imaging devices, only two other markers are necessary to solve the optimization problem. In such an instance, assuming the markers are within the field of view of each imaging device, there are eight unknown parameters and nine observations. The eight unknown parameters include the six unknown imaging device parameters (three for each of the two imaging devices) and the two unknown albedo parameters for the two additional markers. The nine observations are the observations of each of the three markers by each of the three imaging devices.

Figure 3B:
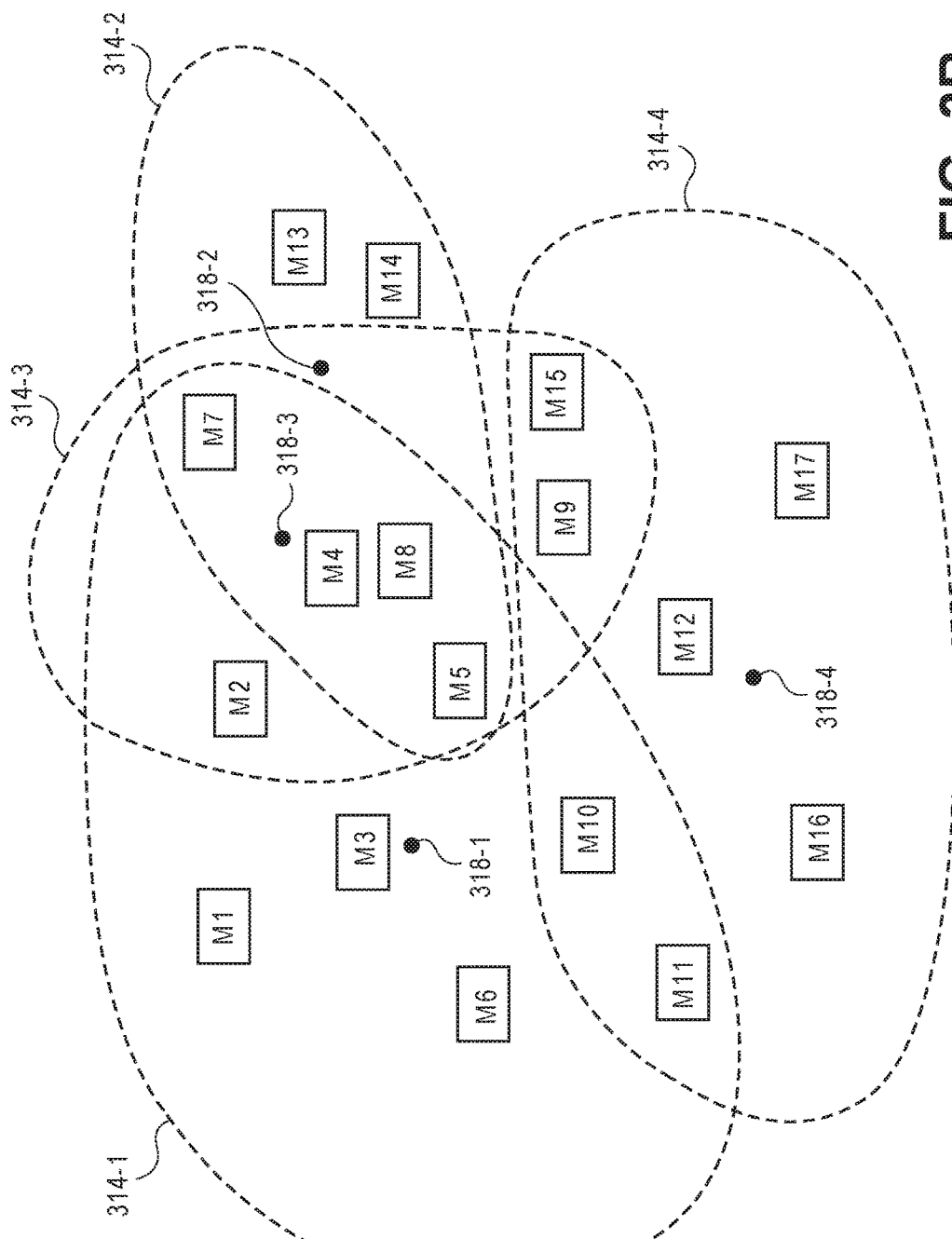
FIG. 3B is another block diagram illustrating overlapping fields of view of imaging devices and corresponding markers, in accordance with described implementations.

FIG. 3B is another block diagram illustrating overlapping fields of view of imaging devices and corresponding markers, in accordance with described implementations. While the example in FIG. 3A illustrates that all the markers are within a common field of view of each imaging device under consideration, the described implementations are equally applicable to instances in which not all of the markers are within the field of view of all of the imaging devices. Provided the number of observations is greater than or equal to the number of unknown parameters, the optimization problem (4) can be solved and a transformation function determined for each of the imaging device.

In the example illustrated in FIG. 3B, there are four imaging devices 318-1, 318-2, 318-3, and 318-4, each with a corresponding field of view 314-1, 314-2, 314-3, and 314-4. Also illustrated in FIG. 3B are seventeen markers M1, M2, M3, M4, M5, M6, M7, M8, M9, M10, M11, M12, M13, M14, M15, M16, and M17, each of which are in the field of view 314 of one or more of the imaging devices 318. In the illustrated example, three of the markers M1, M3, and M6 are only the field of view 314-1 of imaging device 318-1, three of the markers M12, M16, and M17 are only in the field of view 314-4 of imaging device 318-4 and two of the markers M13 and M14 are only the field of view 314-2 of imaging device 314-2. Marker M2 is in the field of view 314-1 of imaging device 318-1 and in the field of view 314-3 of imaging device 318-3. Markers M9 and M15 are in the field of view 314-3 of imaging device 318-3 and in the field of view 314-4 of imaging device 318-4. Markers M10 and M11 are in the field of view 314-1 of imaging device 318-1 and in the field of view 314-4 of imaging device 318-8. Markers M4, M5, M7, and M8 are in the field of view 314-1 of imaging device 318-1, in the field of view 314-2 of imaging device 318-2, and in the field of view 314-3 of imaging device 318-3.

Based on the overlapping fields of view and the positions of the markers, there are a total of 30 observations. Specifically, markers M1, M3, M6, M12, M13, M14, M16, and M17 are each observed once for a total of eight observations, markers M2, M9, M10, M11, and M15 are each observed twice for a total of ten observations, and markers M4, M5, M7, and M8 are each observed three times, for a total of twelve observations. Likewise, because there are four imaging devices and seventeen markers, there are a total of twenty-nine unknown observations. As discussed above, because the number of observations is greater than or equal to the number of unknown parameters, the optimization problem (4) can be solved, parameters determined, and transformation functions established for each imaging device 318-1, 318-2, 318-3, and 318-4. Those transformation functions may then be used to transform pixel values of image data from those imaging device from the local color space of the imaging device to the global color space.

Determination of transformation functions for imaging devices may be done for each channel of each imaging device within a materials handling facility. Likewise, the optimization problem may be performed recursively on successive imaging devices, independent on groups of imaging devices, such as a cluster of imaging devices, or may performed to include all imaging devices.

Figure 4:
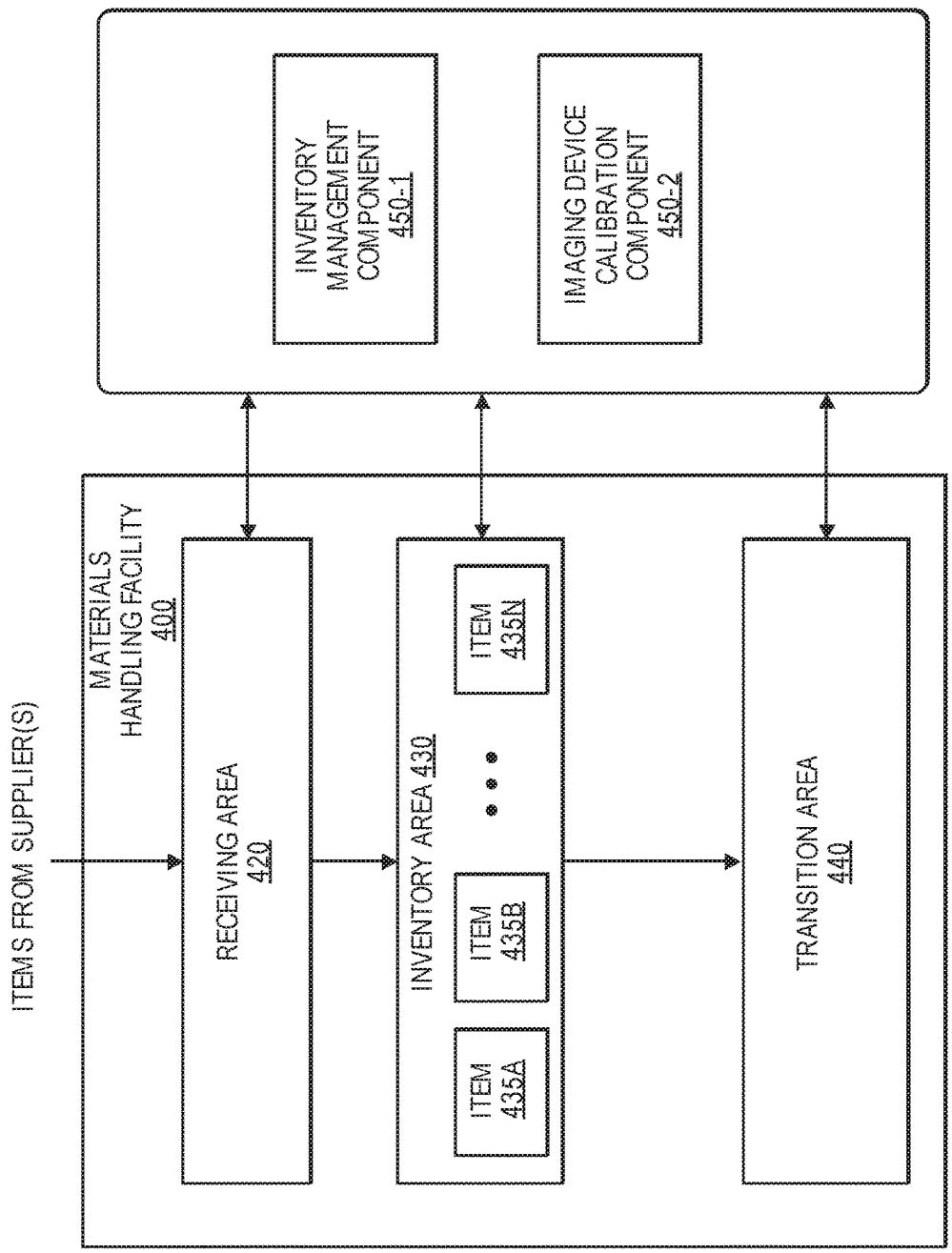
FIG. 4 is a block diagram illustrating a materials handling facility, in accordance with described implementations.

FIG. 4 illustrates a block diagram of a materials handling facility configured to store and manage inventory items, in accordance with the described implementations. As shown, a materials handling facility 400 includes a receiving area 420, an inventory area 430 configured to store an arbitrary number of inventory items 435A-435N, and one or more transition areas 440. The arrangement of the various areas within materials handling facility 400 is depicted functionally rather than schematically. For example, in some implementations, multiple different receiving areas 420, inventory areas 430 and/or transition areas 440 may be interspersed rather than segregated. Additionally, the materials handling facility 400 includes an inventory management component 450-1 configured to interact with each of receiving area 420, inventory area 430, transition area 440 and/or agents within the materials handling facility 400. Likewise, the materials handling facility includes an imaging device calibration component 450-2 configured to interact with imaging devices within the materials handling facility and initiate calibration of the imaging devices, as discussed herein, to determine transformation functions for each imaging device.

Calibration of the imaging devices as discussed herein to determine transformation functions may be initiated by the imaging device calibration component 450-2 on a periodic bases, scheduled, and/or randomly initiated. In some implementations, each imaging device may be recalibrated to determine a new transformation function every few minutes to account for variations in lighting conditions within the field of view of the imaging device.

The materials handling facility 400 may be configured to receive different kinds of inventory items 435 from various suppliers and to store them until an agent retrieves one or more of the items. The general flow of items through the materials handling facility 400 is indicated using arrows. Specifically, as illustrated in this example, items 435 may be received from one or more suppliers, such as manufacturers, distributors, wholesalers, etc., at receiving area 420. In various implementations, items 435 may include merchandise, commodities, perishables, or any suitable type of item depending on the nature of the enterprise that operates the materials handling facility 400.

Upon being received from a supplier at receiving area 420, items 435 may be prepared for storage. For example, in some implementations, items 435 may be unpacked or otherwise rearranged and the inventory management component (which, as described, may include one or more software applications executing on a computer system) may be updated to reflect the type, quantity, condition, cost, location or any other suitable parameters with respect to newly received items 435. It is noted that items 435 may be stocked, managed or dispensed in terms of countable, individual units or multiples of units, such as packages, cartons, crates, pallets or other suitable aggregations. Alternatively, some items 435, such as bulk products, commodities, etc., may be stored in continuous or arbitrarily divisible amounts that may not be inherently organized into countable units. Such items 435 may be managed in terms of measurable quantities, such as units of length, area, volume, weight, or other dimensional properties characterized by units of measurement. Generally speaking, a quantity of an item 435 may refer to either a countable number of individual or aggregate units of an item 435 or a measurable amount of an item 435, as appropriate.

After arriving through receiving area 420, items 435 may be stored within inventory area 430 on an inventory shelf. In some implementations, like items 435 may be stored or displayed together in bins, on shelves or via other suitable storage mechanisms, such that all items 435 of a given kind are stored in one location. In other implementations, like items 435 may be stored in different locations. For example, to optimize retrieval of certain items 435 having high turnover or velocity within a large physical facility, those items 435 may be stored in several different locations to reduce congestion that might occur at a single point of storage.

When an order specifying one or more items 435 is received, or as an agent progresses through the materials handling facility 400, the corresponding items 435 may be selected or "picked" (an event) from the inventory area 430. For example, in one implementation, an agent may have a list of items to pick and may progress through the materials handling facility picking items 435 from the inventory area 430. In other implementations, an agent may pick items 435 using written or electronic pick lists derived from orders. In some instances, an item may need to be repositioned from one location within the inventory area 430 to another location. For example, in some instances, an item may be picked from its inventory location, moved a distance, and placed (an event) at another location. An "event," as used herein, is a detected movement of an item. For example, an event may be a detected movement of an item when the item is picked from an inventory location or a detected movement of an item when the item is placed at an inventory location.

As discussed herein, as the agent moves through the materials handling facility, images of the agent may be obtained and processed to determine an agent pattern representative of the agent and to track a position of the agent as the agent moves. Likewise, in some implementations, descriptors representative of the agent may be periodically determined for the agent from the obtained images as the agent moves about the materials handling facility. By calibrating all of the imaging devices to a global color space, tracking and/or re-identification of the agent and/or items (collectively objects) is improved.

Figure 5:
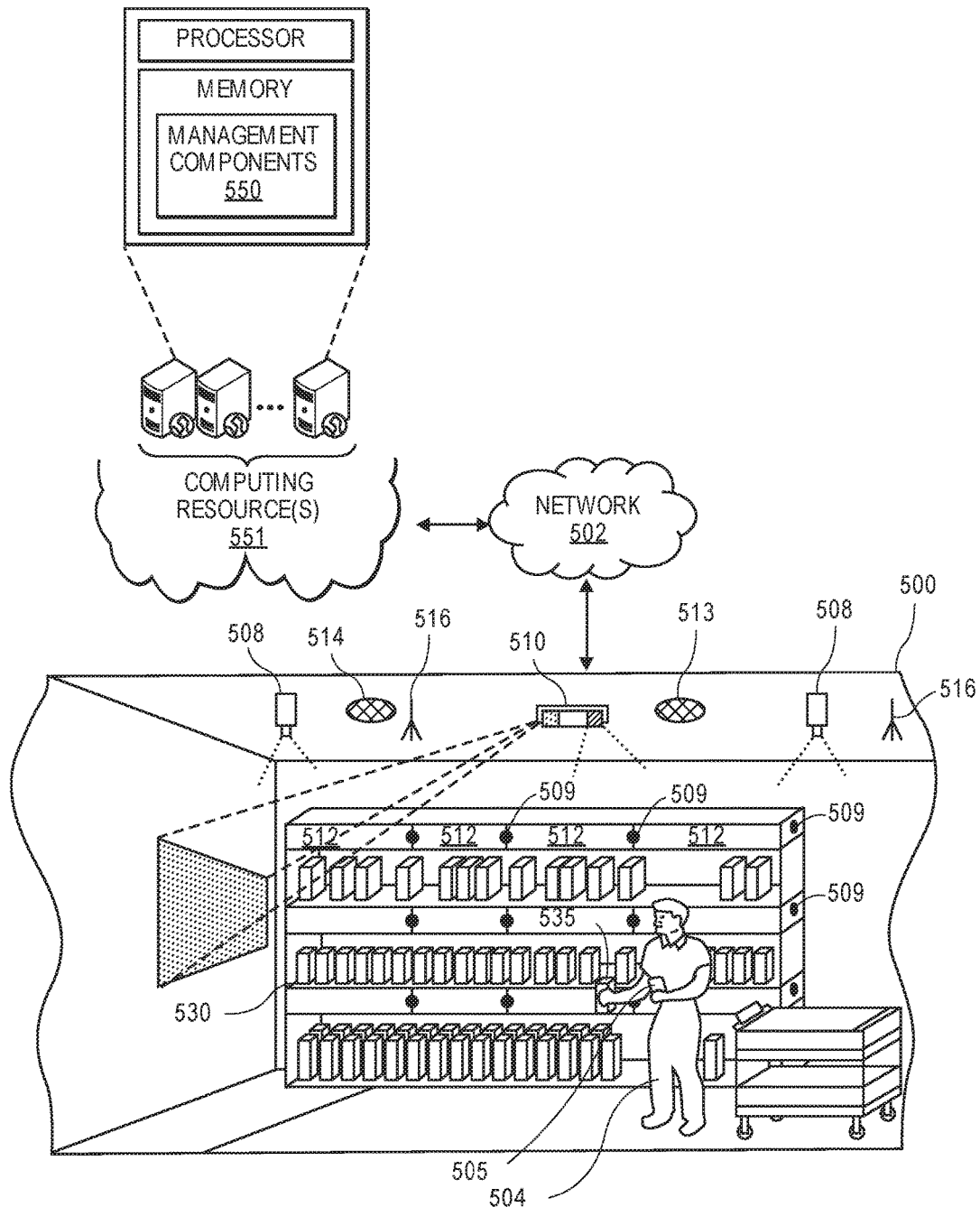
FIG. 5 shows additional components of the materials handling facility of FIG. 4, in accordance with described implementations.

FIG. 5 shows additional components of a materials handling facility 500, according to one implementation. Generally, the materials handling facility 500 may include one or more imaging devices 508, 509, such as cameras. In some implementations, the overhead imaging devices 508 may be positioned overhead, such as on the ceiling, and oriented toward a surface (e.g., floor) of the materials handling facility so that the overhead imaging devices 508 are approximately perpendicular with the surface and the field of view is oriented toward the surface. The overhead imaging devices 508 are used to capture images of agents and/or locations within the materials handling facility from an overhead or top-down view. Likewise, one or more side-view imaging devices 509 may be positioned on, inside, or adjacent to inventory areas and/or otherwise positioned and oriented so that an inventory location is within a field of view of the side-view imaging device 509. For example, a series of side-view imaging devices 509 may be positioned on external portions of inventory areas and oriented to capture images of agents and/or other inventory locations (e.g., those on an opposite side of an aisle). In some implementations, side-view imaging devices 509 may be arranged throughout the materials handling facility such that each inventory location is within a field of view of at least two side-view imaging devices 509.

Any type of imaging device and/or configuration of imaging devices may be used with the implementations described herein. Likewise, each of the imaging devices may be calibrated using the implementations discussed herein such that each imaging device has a corresponding transformation function that is used to transform image data from the imaging device from the local color space of the imaging device to a global color space for the materials handling facility. In some implementations, the transformation of the pixel values using respective transformation functions may be performed at each respective imaging device prior to transmission of the image data by the imaging device. In other implementations, the transformation of pixel values using respective transformation functions may be performed remote from the imaging device, for example by the imaging device calibration component, when the image data is received.

In addition to imaging devices, other input devices, such as pressure sensors, infrared sensors, scales, light curtains, load cells, RFID readers, etc., may be utilized with the implementations described herein. For example, a pressure sensor and/or a scale may be used to detect the presence or absence of items and/or to determine when an item is added and/or removed from inventory areas. Likewise, an RFID reader that can detect a tag included on an item as the item passes into or out of the inventory location may be utilized to detect the presence or absence of an item. For example, if the item includes an RFID tag, an RFID reader may detect the RFID tag as the item passes into or out of the inventory location. Alternatively, or in addition thereto, the inventory shelf may include one or more antenna elements coupled to an RFID reader that are configured to read RFID tags of items located on the inventory shelf.

When an agent 504 arrives at the materials handling facility 500, one or more overhead images of the agent 504 may be captured, transformed to the global color space, and processed using overhead imaging devices 508 and/or the management components 450. For example, transformed images of the agent 504 may be processed to identify the agent. This may be done using a variety of techniques, such as object recognition, pattern matching, etc. By transforming images of the agent as the agent moves through the facility to the global color space, the pixel values representative of the agent in image data from different imaging devices is the same or similar, thereby improving the ability to identify, track, and/or re-identify the agent between images. In some implementations, rather than or in addition to processing images to identify the agent 504, other techniques may be utilized to identify the agent. For example, the agent may provide an identification (e.g., agent name, password), the agent may present an identifier (e.g., identification badge, card), an RFID tag in the possession of the agent may be detected, a visual tag (e.g., barcode, bokode, watermark) in the possession of the agent may be detected, etc.

The captured and globally transformed images and/or other inputs may also be used to establish an agent pattern for the agent 504 while located in the materials handling facility 500. For example, agent patterns are determined from image data produced by overhead imaging devices 508 that has been transformed from the respective local color space of those devices to the global color space of the materials handling facility. As the agent moves, the position and orientation of the agent pattern is updated and is used to track the agent as the agent moves throughout the materials handling facility.

In addition to establishing an agent pattern when the agent first arrives at the materials handling facility and is identified, one or more descriptors representative of the agent or the agent pattern may be determined. For example, one or more descriptor regions may be established, such as a torso region or a head region, and a descriptor representative of the region may be determined, stored in a descriptor data store and associated with the agent or the agent pattern while the agent is located in the materials handling facility. In some implementations, the determined agent patterns of the agent may be stored and maintained as representative of the agent and used at a later point in time to identify the agent (e.g., when the agent returns to the materials handling facility on a different date). In comparison, the descriptors may only be stored for a limited period of time and used to identify the agent during the current time they are in the materials handling facility. When the agent exits the materials handling facility, the descriptors may be discarded.

Returning to FIG. 5, in some implementations, an agent located in the materials handling facility 500 may possess a portable device 505 and obtain information about items located within the materials handling facility 500, receive confirmation that the inventory management component has correctly identified items that are picked and/or placed by the agent, receive requests for confirmation regarding one or more event aspects, etc. Generally, the portable device has at least a wireless module to facilitate communication with the management components 450 (e.g., the inventory management component) and a display (e.g., a touch based display) to facilitate visible presentation to and interaction with the agent. The portable device 505 may store a unique identifier and provide that unique identifier to the management components 450 and be used to identify the agent. In some instances, the portable device may also have other features, such as audio input/output (e.g., speaker(s), microphone(s)), video input/output (camera(s), projector(s)), haptics (e.g., keyboard, keypad, touch screen, joystick, control buttons) and/or other components.

In some instances, the portable device may operate in conjunction with or may otherwise utilize or communicate with one or more components of the management components 450. Likewise, components of the management components 450 may interact and communicate with the portable device as well as identify the agent, communicate with the agent via other means and/or communicate with other components of the management components 450.

Generally, the management components 450 may include one or more input/output devices, such as imaging devices (e.g., cameras) 508, projectors 510, displays 512, speakers 513, microphones 514, illumination elements (e.g., lights), etc., to facilitate communication between the management components 450 and/or the agent and detection of items, events and/or other actions within the materials handling facility 500. In some implementations, multiple input/output devices may be distributed within the materials handling facility 500. For example, there may be multiple imaging devices, such as imaging devices located on the ceilings (overhead cameras) and/or cameras (such as pico-cameras) located in the aisles near the inventory items (side-view cameras).

Likewise, the management components 450 may also include one or more communication devices, such as wireless antennas 516, which facilitate wireless communication (e.g., Wi-Fi, Near Field Communication (NFC), Bluetooth) between the management components 450 and other components or devices. The management components 450 may also include one or more computing resource(s) 551, such as a server system, that may be local to the environment (e.g., materials handling facility), remote from the environment, or any combination thereof.

The management components 450 may utilize antennas 516 within the materials handling facility 500 to create a network 502 (e.g., Wi-Fi) so that the components and devices can connect to and communicate with the management components 450. For example, when the agent picks an item 535 from an inventory area 530, image data from an imaging device may be transformed to the global color space and processed to detect the removal of the item and the management components 450 may receive information, such as image data of the performed action (item pick from the inventory area), identifying that an item has been picked from the inventory area 530. The event aspects (e.g., agent identity, action performed, item involved in the event) may then be determined by the management components 450.

Figure 6:
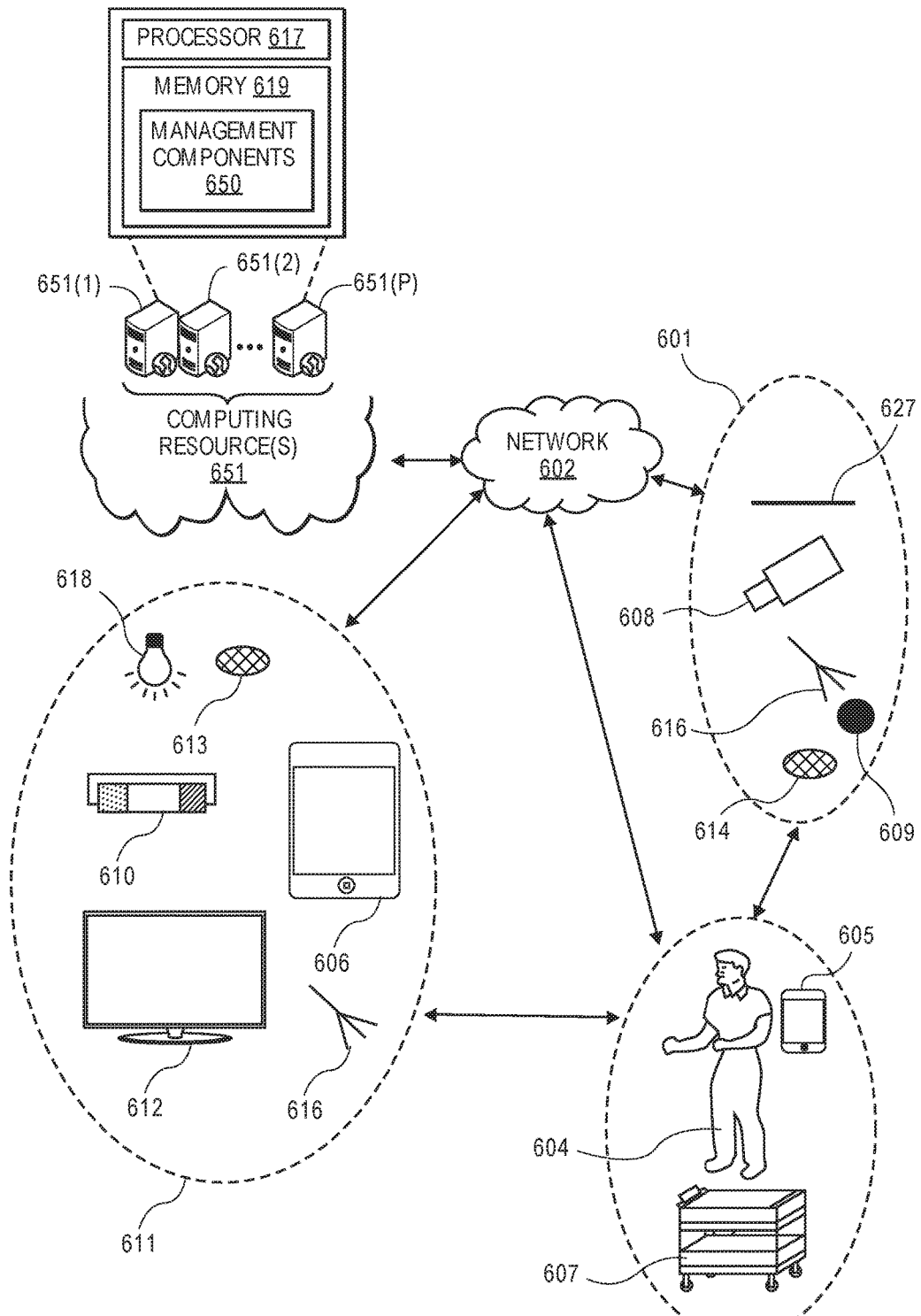
FIG. 6 shows components and communication paths between component types utilized in a materials handling facility of FIG. 4, in accordance with described implementations.

FIG. 6 shows example devices and communication paths between device types utilized in a materials handling facility, according to described implementations. A portable device 605 may communicate and interact with various devices over a variety of communication paths. Generally, the system may include input components 601, output components 611 and computing resource(s) 651. The input components 601 may include an overhead imaging device 608, side-view imaging device 609, a multiple-device apparatus 627, microphone 614, antenna 616, or any other device or component that is capable of receiving input about the surrounding environment and/or from the agent. The output components 611 may include a projector 610, a portable device 606, a display 612, an antenna 616, a radio (not shown), speakers 613, illumination sources 618 (e.g., lights), and/or any other device or component that is capable of providing output to the surrounding environment and/or the agent.

The system may also include computing resource(s) 651. The computing resource(s) 651 may be local to the environment (e.g., materials handling facility), remote from the environment, or any combination thereof. Likewise, the computing resource(s) 651 may be configured to communicate over a network 602 with input components 601, output components 611 and/or directly with the portable device 605, an agent 604 and/or the tote 607.

As illustrated, the computing resource(s) 651 may be remote from the environment and implemented as one or more servers 651(1), 651(2), . . . , 651(P) and may, in some instances, form a portion of a network-accessible computing platform implemented as a computing infrastructure of processors, storage, software, data access, and so forth that is maintained and accessible by components/devices of the system materials handling facility and/or the portable device 605 via a network 602, such as an intranet (e.g., local area network), the Internet, etc. The computing resources 651 may process images of agents to identify the agent, process images of items to identify items, determine a location of items, determine a position of items, determine if a re-calibration of the imaging devices to adjust the transformation functions based on changes in the environment (e.g., lighting conditions), and the like. The server system(s) 651 does not require end-agent knowledge of the physical location and configuration of the system that delivers the services. Common expressions associated for these remote computing resource(s) 651 include "on-demand computing," "software as a service (SaaS)," "platform computing," "network-accessible platform," "cloud services," "data centers," and so forth.

Each of the servers 651(1)-(P) include a processor 617 and memory 619, which may store or otherwise have access to management components 450, which may include or provide image processing (e.g., for agent identification, item identification, etc.), inventory tracking, and/or location determination.

The network 602 may utilize wired technologies (e.g., wires, USB, fiber optic cable, etc.), wireless technologies (e.g., radio frequency, infrared, NFC, cellular, satellite, Bluetooth, etc.), or other connection technologies. The network 602 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

The various sensors and computer systems described above may collect a wide variety of data relating to users of systems or facilities employing such sensors or computer systems. The data relating to users may include, for example, images, video, location information, travel patterns, personal identification information, transaction history information, user preferences, and the like. The sensors, systems, and techniques described herein would be typically configured to process this information in a manner that ensures compliance with all appropriate laws, regulations, standards, and the like.

Figure 7:
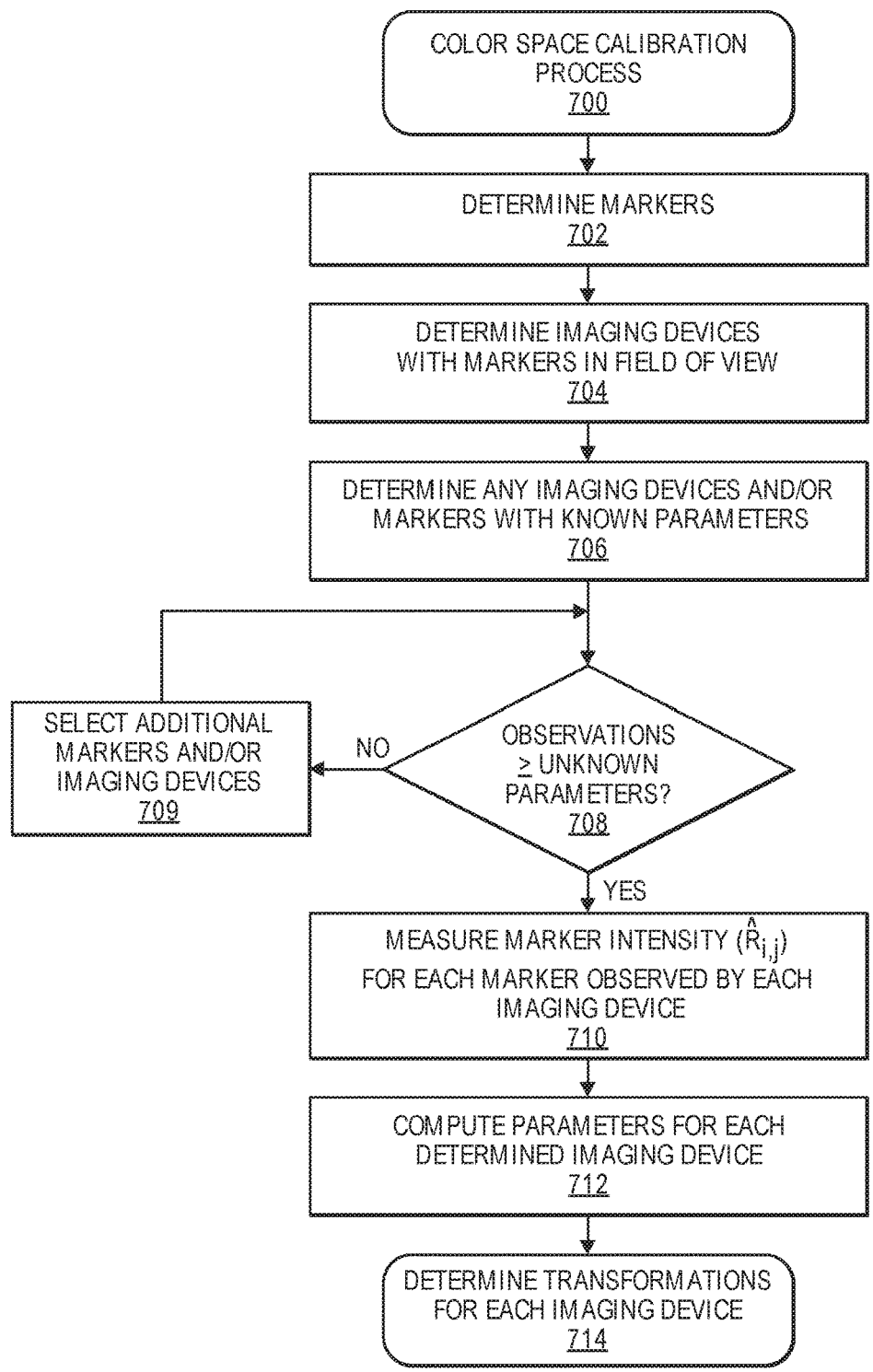
FIG. 7 is a flow diagram of an example color space calibration process, in accordance with described implementations.

FIG. 7 is a flow diagram of an example color space calibration process 700, in accordance with described implementations. The color space calibration process may be periodically performed on imaging devices of a plurality of imaging devices so that each imaging device includes a respective transformation function that is used to transform image data from the imaging device from a local color space to a global color space.

The example process 700 begins by determining a plurality of markers to be used in the example process 700, as in 702. As discussed above, the markers may be any visible item within the field of view of two or more imaging devices. If the marker is stationary, two or more imaging devices may have the marker within their field of view. The two or more imaging devices may be fixed and stationary or may be adjustable and/or movable such that the field of view may be moved to include the marker. In instances where the marker is mobile (e.g., the marker is an agent, a machine, etc.), the marker may move between different fields of view of different imaging devices. In such an example, the fields of view of the imaging devices may or may not overlap.

Upon determining the plurality of markers, the imaging devices that include the marker in the respective field of view or that will include the marker within the respective field of view are determined, as in 704. In addition, it may further be determined whether any of the imaging devices determined at block 704 and/or any of the markers determined at block 702 already have defined parameter values—i.e., have already been calibrated and have current calibrations, as in 706. A marker and/or imaging device may be determined to be calibrated and have known parameters if the marker and/or imaging device has been recently calibrated by the example process 700 along with another set of imaging devices. Determined markers and determined imaging devices that have not been recently calibrated by the example process 700 are considered to be uncalibrated markers (also referred to herein as unknown markers) and uncalibrated imaging devices, respectively.

Once the uncalibrated imaging devices and uncalibrated markers are determined, a determination is made as to whether the number of observations that will be made is greater than or equal to the number of unknown parameters, as in 708. As discussed above, each uncalibrated imaging device corresponds to three unknown parameters and each uncalibrated marker corresponds to an unknown parameter, the albedo of the marker. In comparison, calibrated imaging devices and calibrated markers, while not having any unknown parameters increase the number of observations. An observation exists for each imaging device and marker pair.

If it is determined that the number of observations is not greater than or equal to the number of unknown parameters, the example process 700 determines additional markers and/or imaging devices, as in 709, and continues.

Once it is determined that the number of observations is greater than or equal to the number of unknown parameters, the marker intensity ($R_{i,j}$) is measured for each marker as observed by each imaging device, as in 710. The marker intensity may be measured by taking a pixel value representative of the marker from image data produced by the imaging device. In some implementations, the pixel value used for calibration may be an average of a plurality of pixel values of the image data that correspond to the marker. The pixel values may be obtained from different pixels of the same image data, different pixels of different image data (e.g., a series of images of the marker), and/or from the same pixels of different image data.

Based on the measured observations of the marker intensity from each imaging device, the parameters for each uncalibrated imaging device may be computed by solving an optimization problem, such as the optimization problem (4) discussed above, as in 712. Finally, for each imaging device, the determined parameters for that imaging device are used to form a transformation function, as in 714. The transformation function is used to convert pixel values of image data produced by the imaging device from a local color space to the global color space so that the pixel values representative of an object will be the same or similar regardless of the imaging device of the plurality of imaging devices that produces the image data representative of the object.

While the above examples provide examples for determining a transformation function that is used to transform image data from a local color space of an imaging device to a global color space that assumes the observed intensity of each imaging device when calibrated is random, in some implementations we may utilize prior knowledge of one or more observed intensities for one or more of the imaging devices being calibrated by considering the problem in a probabilistic setting.

For example, in the above implementations we assume the imaging device response R of an imaging device being calibrated is a random variable, and its distribution depends on both the albedo of the marker ($\varphi$ and the various imaging device and lighting parameters denoted by $\theta=(k, \gamma, d)$:

$$R \sim (R|\rho,\theta) \tag{A}$$

As an example, and based on the equations discussed above:

$$R \sim (R|\rho,k,\gamma,d) = N(\mu = k^*\rho^\gamma + d, \sigma^2)$$

This equation says that the response R is a normal random variable, with mean=expected value of $k^*\rho^\gamma+d$, and variance of $\sigma^2$. While the above provides an example model, other forms of model and parameters may likewise be utilized.

As also discussed above, we have albedo parameters ($\rho_j$) for every marker j, and imaging device and lighting parameters $\theta_i=(k_i, \gamma_i, d_i)$ for every imaging device. These lead to observations $R_{i,j}$ of point j by imaging device i. Like the single observation model described in equation (A), we may write the probabilistic formulation for all of the observations as:

$$R_{1,1}, R_{1,2}, \ldots \sim P(R_{i,j}|\rho_j, \theta_i)$$

Utilizing the probabilistic formulation, the albedo ($\rho$) of any marker may be determined by finding the posterior distribution. For example, if we want to find the albedo of the third marker ($\rho_3$), the posterior distribution is:

$$P(\rho_3|R_{1,1}, R_{1,2}, \ldots) = ?$$

These may be answered using principled inference methods. For example, a maximum-likelihood may be determined which will produce a minimization problem similar to the one discussed above, or a Bayesian inference which would yield an integration problem. In the Bayesian setting, we could incorporate any prior knowledge of all or some of the unknown parameters, such as the parameters values determined in a previous calibration.

Accordingly, as will be appreciated, the above are example formulations for automatically determining parameter values for imaging devices based on a number of observations of a number of markers by a number of imaging devices such that the number of observations is greater than or equal to the number of unknown parameters. In other examples, other formulations may likewise be utilized within the spirit and scope of the described implementations.

Figure 8:
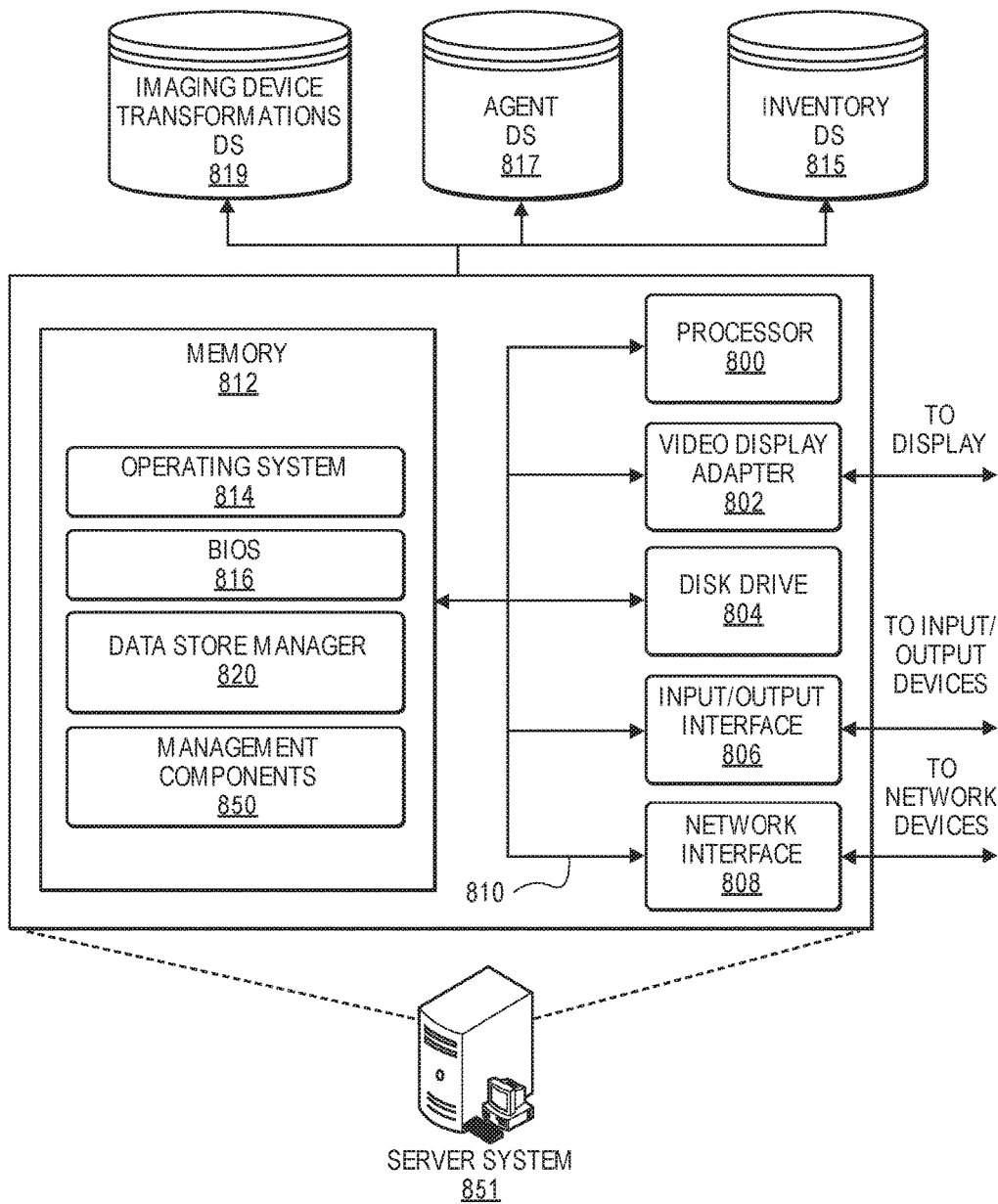
FIG. 8 is a block diagram of an illustrative implementation of a server system that may be used with various implementations.

FIG. 8 is a pictorial diagram of an illustrative implementation of a server system 851, such as the server system 851, that may be used in the implementations described herein. The server system illustrated in FIG. 8, or another similar server system, may be configured as the management components (e.g., inventory management component, imaging device calibration component).

The server system 851 may include a processor 800, such as one or more redundant processors, a video display adapter 802, a disk drive 804, an input/output interface 806, a network interface 808, and a memory 812. The processor 800, the video display adapter 802, the disk drive 804, the input/output interface 806, the network interface 808, and the memory 812 may be communicatively coupled to each other by a communication bus 810.

The video display adapter 802 provides display signals to a local display (not shown in FIG. 8) permitting an operator of the server system 851 to monitor and configure operation of the server system 851. The input/output interface 806 likewise communicates with external input/output devices not shown in FIG. 8, such as a mouse, keyboard, scanner, or other input and output devices that can be operated by an operator of the server system 851. The network interface 808 includes hardware, software, or any combination thereof, to communicate with other computing devices. For example, the network interface 808 may be configured to provide communications between the server system 851 and other computing devices via a network, such as the network shown in FIG. 6.

The memory 812 generally comprises random access memory (RAM), read-only memory (ROM), flash memory, and/or other volatile or permanent memory. The memory 812 is shown storing an operating system 814 for controlling the operation of the server system 851. A binary input/output system (BIOS) 816 for controlling the low-level operation of the server system 851 is also stored in the memory 812.

The memory 812 additionally stores program code and data for providing network services. The data store manager application 820 facilitates data exchange between the inventory table data store 815, the agent profile data store 817, and/or the imaging device transformation data store 819.

As used herein, the term "data store" refers to any device or combination of devices capable of storing, accessing and retrieving data which may include any combination and number of data servers, databases, data storage devices and data storage media in any standard, distributed or clustered environment. The server system 851 can include any appropriate hardware and software for integrating with the data stores 815, 817, and 819 as needed to execute aspects of the management components 850.

The data stores 815, 817, and 819 can include several separate data tables, databases or other data storage mechanisms and media for storing data relating to a particular aspect. For example, the data stores 815, 817, and 819 illustrated include mechanisms for maintaining inventory information (e.g., item locations, images of item when properly positioned, depth map information for an item located on an inventory shelf, item features), agent profile information, agent pattern information, correlations between imaging devices and real world positions, imaging device transformation functions, imaging device parameters, etc.

It should be understood that there can be many other aspects that may be stored in the data stores 815, 817, and 819. The data stores 815, 817, and 819 are operable, through logic associated therewith, to receive instructions from the server system 851 and obtain, update or otherwise process data in response thereto.

The memory 812 may also include the inventory management component and/or imaging device calibration component, as discussed above, and as generally illustrated by management components 850. The corresponding management components 850 may be executable by the processor 800 to implement one or more of the functions of the server system 851. In one implementation, the corresponding management components 850 may represent instructions embodied in one or more software programs stored in the memory 812. In another implementation, the corresponding management components 850 can represent hardware, software instructions, or a combination thereof.

It will be appreciated by those of ordinary skill in the art that such a system could operate equally well in a system having fewer or a greater number of components than are illustrated in FIG. 8. Thus, the depiction in FIG. 8 should be taken as being illustrative in nature and not limiting to the scope of the disclosure.

The concepts disclosed herein may be applied within a number of different devices and computer systems, including, for example, general-purpose computing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, and image processing should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented in firmware or hardware.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:
1. A computer implemented method, comprising:
under control of one or more computing systems configured with executable instructions, receiving, from each of a plurality of cameras, image data produced by the respective camera, each image data including a representation of one or more of a plurality of markers positioned within a materials handling facility, wherein each image data includes a plurality of pixel values;

determining that a first sum of a number of representations of markers included in the plurality of image data is greater than a second sum of a number of parameters of the plurality of cameras and a number of the plurality of markers;

determining from pixel values of each image data, a respective intensity value for each representation of each marker in each image data from each of the plurality of cameras;

determining based on the respective intensity value determined for each representation of each marker in each image data from each of the plurality of cameras, a plurality of parameters for each of the plurality of cameras;

generating for each camera of the plurality of cameras a respective transformation function based on the parameters for the camera;

receiving second image data from a first camera of the plurality of cameras, wherein the second image data includes a second plurality of pixel values; and transforming at least a portion of the pixel values of the second image data according to a first transformation function corresponding to the first camera to produce transformed second image data corresponding to a global color space.

2. The computer implemented method of claim 1, further comprising:

receiving third image data from a second camera of the plurality of cameras, wherein:
the third image data includes a third plurality of pixel values; and
transforming pixel values of the third image data according to a second transformation function corresponding to the second camera to produce transformed third image data corresponding to the global color space.

3. The computer implemented method of claim 2, wherein:
the second image data includes a first representation of an object;
prior to transforming pixel values of the second image data, the pixel values of the second image data representative of the object have first values;
the third image data includes a second representation of the object;
prior to transforming the pixel values of the third image data, the pixel values of the third image data representative of the object have second values;
the first values are different than the second values; and
subsequent to transforming the first image data and the second image data, the transformed second image data and the transformed third image data include substantially similar pixel values for the object.

4. The computer implemented method of claim 3, wherein the pixel values of the third image data are dependent at least in part on the plurality of parameters of the second camera and a lighting condition within a field of view of the second camera.

5. A system, comprising:
a plurality of imaging devices within a materials handling facility and positioned to obtain image data representative of objects within the materials handling facility;

one or more processors; and
a memory coupled to the one or more processors and storing program instructions that when executed cause the one or more processor to at least:
receive first image data from a first imaging device of the plurality of imaging devices, the first image data including a first plurality of pixel values;
receive a second image data from a second imaging device of the plurality of imaging devices, the second image data including a second plurality of pixel values;
determine that a number of representations of a marker represented by at least a portion of the first image data and at least a portion of the second image data is greater than or equal to a number of parameters;
determine from the first plurality of pixel values, a first intensity value for the marker represented by at least a portion of the first image data;
determine from the second plurality of pixel values, a second intensity value for the marker represented by at least a portion of the second image data;
determine, based at least in part on the first intensity value for the marker represented in the first image data and the second intensity value for the marker represented in the second image data, a first parameter value for the first imaging device and a second parameter value for the second imaging device;
determine, based at least in part on the first parameter value, a first transformation function for the first imaging device; and
determine, based at least in part on the second parameter value, a second transformation function for the second imaging device.

6. The system of claim 5, wherein:
the first plurality of pixel values from the first imaging device correspond to one of a red channel, a blue channel, or a green channel;
the second plurality of pixel values from the second imaging device correspond to the same one of the red channel, the blue channel, or the green channel;
the first transformation function corresponds to the same one of the red channel, the blue channel, or the green channel; and
the second transformation function corresponds to the same one of the red channel, the blue channel, or the green channel.

7. The system of claim 5, wherein an albedo of the marker is unknown.

8. The system of claim 5, wherein the program instructions that cause the one or more processors to determine, based at least in part on the first intensity value for the marker represented in the first image data and the second intensity value for the marker represented in the second image data, a first parameter value for the first imaging device and a second parameter value for the second imaging device, further cause the one or more processors to at least:
determine the first parameter value and the second parameter value by solving an optimization problem based at least in part on the first intensity value and the second intensity value.

9. The system of claim 5, wherein the program instructions further cause the one or more processors to at least:
receive third image data from a third imaging device of the plurality of imaging devices, the third image data including a third plurality of pixel values, the third imaging device having a third parameter that is different than the first parameter and the second parameter; and determine from the third plurality of pixel values a third intensity value for the marker represented by at least a portion of the third image data and a fourth intensity value for a second marker represented by at least a portion of the third image data; and wherein the first parameter and the second parameter are each determined based at least in part on the first intensity value for the markers represented in the first image data, the second intensity value for the markers represented in the second image data, the third intensity value for the marker represented in the third image data, and the fourth intensity value for the second marker represented in the third image data.

10. The system of claim 9, wherein:
the first imaging device includes three parameters;
the second imaging device includes three parameters; and
the program instructions further cause the one or more processors to at least:
determine that a first sum of a number of representations of markers included in the first image data or the second image data is greater than or equal to a number of parameters and a number of markers.

11. The system of claim 5, wherein the program instructions further cause the one or more processors to at least:
receive third image data from a third imaging device of the plurality of imaging devices, the third image data including a third plurality of pixel values, the third imaging device having a third parameter that is different than the first parameter and the second parameter; and
determine from the third plurality of pixel values a third intensity value for a second marker represented by at least a portion of the third image data; and
wherein the respective value for the first parameter and the second parameter is determined based at least in part on the first intensity value for the marker represented in the first image data, the second intensity value for the marker represented in the second image data, and the third intensity value for the second marker represented in the third image data.

12. The system of claim 11, wherein:
the first imaging device includes three parameters;
the second imaging device includes three parameters;
the third imaging device includes three parameters; and
the program instructions further cause the one or more processors to at least:
determine that a first sum of a number of representations of markers included in the first image data, the second image data, and the third image data is greater than or equal to a second sum of a number of parameters and a number of markers.

13. The system of claim 5, wherein a first field of view of the first imaging device does not overlap with a second field of view of the second imaging device.

14. A system, comprising:
a materials handling facility having at least a first lighting condition in a first area within the materials handling facility and a second lighting condition in a second area within the materials handling facility;
a plurality of imaging devices distributed within the materials handling facility, at least a first imaging device having a first field of view of at least a portion of the first area and at least a second imaging device having a second field of view of at least a portion of the second area;
an imaging device calibration component in communication with each of the plurality of imaging devices, the imaging device calibration component configured to at least:
receive from the first imaging device first image data, the first image data including a first plurality of pixel values;
receive from a second imaging device second image data, the second image data including a second plurality of pixel values;
determine from the first plurality of pixel values a respective intensity value for each of a first plurality of markers represented in the first image data;
determine from the second plurality of pixel values a respective intensity value for each of a second plurality of markers represented in the second image data;
determine that a number of representations of markers in the first plurality of markers and the second plurality of markers is greater than or equal to a number of parameters;
determine, based at least in part on the respective intensity values for each of the first plurality of markers represented in the first image data and the second plurality of markers represented in the second image data, a respective parameter value for each of a first plurality of parameters of the first imaging device;
determine, based at least in part on the respective parameter value for each of the first plurality of parameters, a first transformation function for the first imaging device that will transform pixel values of image data from the first imaging device to a global color space;
receive from the first imaging device third image data including a third plurality of pixel values; and
transform, using the first transformation function, at least a portion of the third plurality of pixel values to produce transformed pixel values according to the global color space.

15. The system of claim 14, wherein at least one marker of the first plurality of markers moves from the first area to the second area.

16. The system of claim 14, wherein at least one marker is stationary and at least a portion of the first field of view and the second field of view overlap.

17. The system of claim 14, wherein the imaging device calibration component is further configured to at least:
receive from the first imaging device third image data, the third image data including a third plurality of pixel values, wherein at least a portion of the third plurality of pixel values are representative of an object;
transform, using the first transformation function, at least a portion of the third plurality of pixel values to produce third transformed pixel values corresponding to the global color space;
receive from the second imaging device fourth image data, the fourth image data including a fourth plurality of pixel values, wherein at least a portion of the fourth plurality of pixel values are representative of the object;
transform, using a second transformation function corresponding to the second imaging device, at least a portion of the fourth plurality of pixel values to produce fourth transformed pixel values corresponding to the global color space; and wherein the at least a portion of the third transformed pixel values and at least a portion of the fourth transformed pixel values have substantially similar values.

18. The system of claim 14, wherein the first plurality of parameters of the first imaging device correspond to one or more of a white balance parameter, a gain parameter, or an offset parameter.

19. The computer implemented method of claim 1, wherein a marker of the plurality of markers is any object within the materials handling facility.

20. The system of claim 5, wherein:
the marker is a moving object; and
a first field of view of the first imaging device does not overlap with a second field of view of the second imaging device.

* * * * *